United States Patent [19]

Berg

[11] Patent Number: 4,479,994
[45] Date of Patent: Oct. 30, 1984

[54] WIDE BAND ENERGY ABSORBING CAMOUFLAGE BLANKET

[75] Inventor: Richard M. Berg, Stafford, Va.

[73] Assignee: The United States of America as Represented by the Secretary of the Army, Washington, D.C.

[21] Appl. No.: 495,861

[22] Filed: May 18, 1983

[51] Int. Cl.³ .......................... B32B 5/18; B32B 5/22
[52] U.S. Cl. .................................. 428/195; 428/241; 428/284; 428/314.4; 428/315.9; 428/316.6; 428/325; 428/919
[58] Field of Search ............... 428/195, 919, 241, 284, 428/314.4, 315.9, 316.6

[56] References Cited

U.S. PATENT DOCUMENTS

| | | | |
|---|---|---|---|
| 2,741,824 | 4/1956 | Robbins et al. | 428/919 X |
| 4,064,305 | 12/1977 | Wallin | 428/919 X |
| 4,287,243 | 9/1981 | Nielsen | 428/919 X |

*Primary Examiner*—Thomas J. Herbert
*Attorney, Agent, or Firm*—Anthony T. Lane; Robert P. Gibson; John E. Becker

[57] ABSTRACT

A generally flexible, quilt-like, broad band multispectral camouflage blanket which embodies a matrix of commercially available laminated wide band, energy absorbing material which is precut into polygonal shaped panels to thereby effectively collectively absorb and suppress radar, heat and sound energy. The panels are either removably disposed or otherwise suitably bonded within complementary sized pockets in the blanket fabric and are oriented in a flexible grid-like arrangement. The blanket fabric, such as a KEVLAR nylon or the like, which by its very nature is impervious to water and many other contaminents, is further characterized by a low reflectivity at microwave radar frequencies, and may be visually camouflaged for different tactical environments. The flexibility provided by the grid-like arrangement is compatible with the need to generally convexly conform to the shape of the object being protected or to secure to an intermediate framework in a suitable non-dihedral/trihedral planar angle manner to preclude retroreflection by reentrant geometries of the blanket when used at higher frequencies where it will not absorb energy waves. The same flexibility also enables it to be readily folded for compact stowage.

9 Claims, 4 Drawing Figures

WIDE BAND ENERGY ABSORBING CAMOUFLAGE BLANKET

The invention described herein may be manufactured, used, and licensed by or for the Government for governmental purposes without the payment to me of any royalties thereon.

BACKGROUND OF THE INVENTION

This invention relates to an energy absorbing blanket which is capable of protecting tactical military equipment, especially vehicles, from detection by hostile forces. The blanket is adapted to be draped tightly over the protected equipment and will generally conform to the shape thereof. The invention provides wide band visual, acoustic, heat and radar signature reduction of the protected equipment by means of the blanket hereof which can be folded for compact stowage when not in use and draped conformally over the equipment when used. Normally a vehicle can be driven with the blanket deployed thereon. The wideband energy absorbing features are the result of the use of several different energy suppressing features comprising several known materials laminated together in a known manner to form panels which are arranged in a grid-like pattern between two layers of suitable supporting fabric.

SUMMARY OF THE INVENTION

Each of the aforementioned panels may comprise for example a modification of a laminated radar absorbing material or RAM, which has been used in the prior art for absorbing incident radar waves only. These prior art RAM panels comprise a bottom layer of conductive foil or sheet metal with two or more resistive absorber layers above the foil, with the resistive absorbers separated by dielectrics which have usually comprised foam plastics such as polyurethane. These RAM's absorb incident radar waves by phase cancellation or destructive interference.

The energy absorbing blanket of the present invention comprises panels which function as radar absorbers in the same way as do the prior art RAM panels but in addition are designed to also suppress both thermal and acoustic energy which may be emitted by the protected equipment. This is accomplished by choosing the dielectric material of the panels to have good thermal and acoustic insulating properties as well as the required electrical property to accomplish radar signal absorption. The novel panels can be designated as ATRAM panels, meaning acoustic-thermal-radar absorbing material.

These ATRAM panels are sewn or otherwise bonded within the blanket fabric in a matrix. The blanket fabric can be nylon or the like having a low dielectric constant and may be patterned for visual camouflage. If the aforementioned conductive foil is placed in the middle of the laminated panels with alternated layers of foam dielectric and resistive absorbers on either side thereof, the ATRAM blanket becomes reversible and it can be patterned on each side for different tactical environments, for example one side may have a desert pattern and the other a woodland type pattern.

Reversibility can also be achieved by simply placing two one-sided ATRAM panels back-to-back in each pocket of the blanket, or by reversing a single one-sided panel which is held in an openable pocket in the supporting fabric.

It is thus an object of the invention to provide a camouflage blanket with wide band energy absorbing features plus visual camouflage, and which can be easily placed over an object to be protected and which can be folded for convenient and compact stowage.

Another object of the invention is to provide a blanket which has wide band signature reduction characteristics including acoustic, visual, infrared or heat and radar wavelengths, and which comprises a plurality of panels of laminated materials of different energy affecting characteristics arranged in pockets of supporting blanket fabric so that the blanket can be folded along the various seams between rows and columns of the panels for stowage or unfolded and placed over or alongside of equipment to be protected.

Yet another object of the invention is to provide a wide band energy absorbing and visually camouflaging blanket which when deployed over a vehicle will conform generally to the vehicle's shape and which can be so used while the vehicle is in motion.

A still further object of the invention is to provide a blanket which can be placed over tactical military equipment while in operation to modify the signature thereof by absorbing heat and noise emitted by the protected equipment, absorbing incident radar energy, and providing for visual camouflage.

Another object of the invention is to provide a novel reversible wide band energy absorbing blanket with visual camouflage capability, which blanket can be placed over military equipment to modify the signature thereof and which comprises laminated wide band energy absorbing panels arranged in a matrix either in pockets in a supporting fabric or in a matrix between two sheets of supporting fabric.

These and other advantages of the invention will become apparent from the following detailed description and the drawings.

DETAILED DESCRIPTION OF A PREFERRED EMBODIMENT

Figure 1:
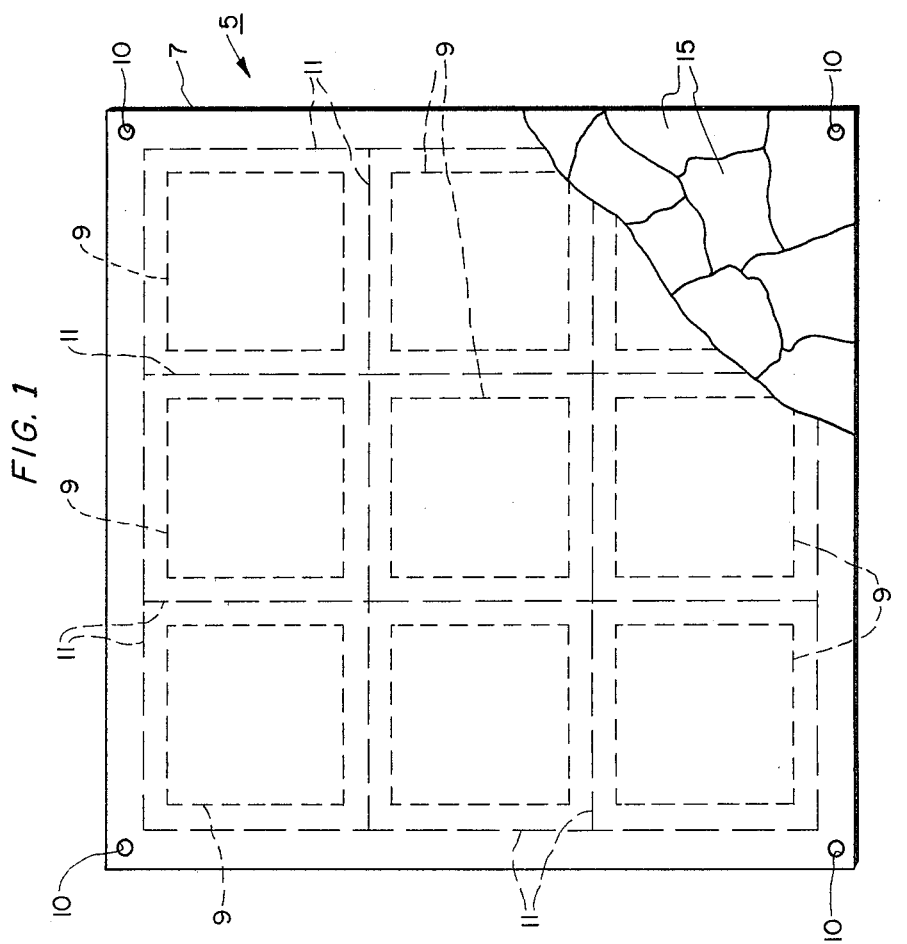
FIG. 1 is a top or plan view of an illustrative embodiment of the novel energy absorbing blanket.
Figure 2:
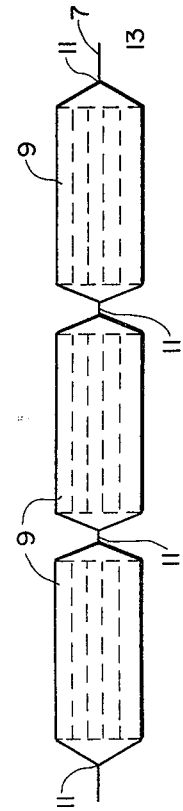
FIG. 2 shows an edge or elevation view of the blanket of FIG. 1.

The energy absorbing blanket illustrated in FIGS. 1 and 2 comprises a 3×3 matrix of energy absorbent panels, 9, mounted between two square sheets of fabric, 7 being the upper fabric and 13 the lower one. The two fabric sheets are held together and the panels held in place therebetween by stitching or bonding along the dashed lines or seams 11 of FIG. 1. The upper fabric sheet 7 is patterned for visual camouflage purposes, as indicated by the irregular pattern 15 in the lower right corner of the blanket as shown in FIG. 1.

Figure 3:
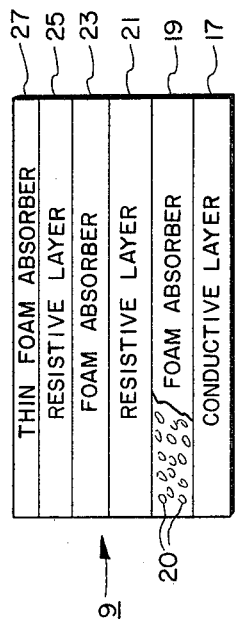
FIGS. 3 and 4 show different types of laminated panels which may be used in the blanket of FIGS. 1 and 2.
Figure 4:
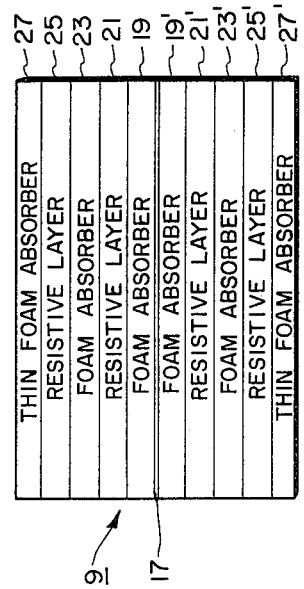

Each one of the panels 9, as shown in FIGS. 2-4, is laminated with a plurality of layers of energy absorbing materials. The panels provide for target signature reduction by absorbing incident radar waves and preventing heat and sound emanating from the protected equipment from reaching the upper surface of the blanket. The fabric is a material of suitable strength with a low dielectric constant, for example nylon, Kevlar, polyvinyl chloride (PVC), or SCRIM textiles, or the like, which by their very nature inherently generally resist water and abrasion and various other forms of contamination.

FIG. 3 shows a laminated ATRAM panel which may be used in a blanket of this type. This type of radar absorbing material (RAM) from which the panels hereof are made or patterned, is commercially available. The Emerson and Cuming Div. of W. R. Grace Co. of Canton Mass. markets its RAM material under the trademark ECCOSORB. Other commercially available weatherproof microwave absorbing materials, also based upon the Jaumann design, are available from Advanced Absorber Products Inc., of Amesbury, Mass. In this panel the lower layer 17 comprises a thin conductive foil or sheet which defines the bottom of the blanket which would be placed against the equipment being protected. The other five layers of this panel comprise the foam absorber 19, a resistive layer 21, another foam absorber 23 with a second resistive layer 25 and the thin foam absorber 27. The prior art RAM panels referred to above have comprised structure similar to that of FIG. 3, arranged to absorb radar waves over a given bandwidth by phase cancellation techniques. These RAM panels are known as the Jaumann design. The Jaumann design merely uses a stacked arrangement of the well-known Salisbury Screen form of Dielectric. The resistive layers such as 21 and 25 have comprised thin sheets of material of suitable resistivity, for example carbon or graphite sheets 0.001 inches thick. To obtain a large radar absorbing bandwidth the resistivity of the resistive layers must be varied, with the outermost or top resistive layer having the highest resistivity and the innermost or bottom layer the least resistivity. For effective wide band phase cancellation, each of resistive layers must be separated by one quarter of the free space of the lowest designed frequency. Thus the foam layers or absorbers 19 and 23 must have an electrical thickness equal to one quarter of the free space wavelength at the lowest design frequency and proportional to the dielectric constant (or the index of refraction) of the dielectric foam absorber, so that each dielectric foam layer comprises a quarter wavelength at the reduced propagational velocity therein. The outermost foam absorber layer 27 is made thinner than the other absorber layers 19 and 23, since the supporting fabric 7, which covers the layer 27 also acts as a dielectric and effectively increases the electrical thickness of the layer 27. Thus the combined absorber layer 27 and the fabric 7 are selected to provide the desired quarter wavelength thickness in order to minimize the surface reflectivity. The foam layers of the prior art RAM panels have been chosen to provide only these desired electrical properties.

In accordance with the present invention, the foam absorbers or layers 19, 23 and 27 are selected or chosen to have good thermal and acoustic insulation properties in addition to the aforementioned required electrical properties. Such an ATRAM panel will then provide wideband thermal, acoustic, and radar absorption. Numerous materials can be used for the foam absorber layers to achieve these ends. A simple and inexpensive material may comprise simply a soft expanded foam plastic with closed interior air cells, to provide a dead air space required for good heat insulation and prevent water absorption. The soft plastic material would provide the required sound absorption or insulation. Another material for such layers would be a syntactic foam comprising hollow glass Microballs in a semi-rigid binder. In such materials, the glass or ceramic balls are either air-filled or evacuated to provide the required low heat conductivity and the soft or semi-rigid binder provides the sound absorption. Such Microballs or air cells are indicated by the numeral 20 in the foam absorber 19 of FIG. 3. Materials of this type are also commercially available from the aforesaid Cumings and Emerson Div. of W. R. Grace Company.

As stated above, the foam absorbers 19 and 23 must be one quarter wavelength at the lowest the radar absorption frequency. Thus for a given center frequency, the thickness of these absorbers will be proportional to the dielectric constant thereof. Thus the lower the dielectric constant, the thinner each foam absorber can be. Since the foam absorber layers make up the great majority of the thickness of the panels, it is important to minimize the dielectric constant thereof. The fabric 7 plus the thin foam absorber layer 27 collectively should have a minimum dielectric constant to provide maximum absorbing bandwidths. Any dielectric will become completely reflective above a critical frequency. This critical frequency is directly proportional to the material's dielectric constant. Thus the dielectric constant of the outer absorbing layer 27 and the fabric 7 is chosen to extend this critical freqency as high as possible. This is because it is desirable that the blanket, or blanket fabric, should not be completely reflective, with the frequency being a high as possible. Thus, the respective materials are carefully chosen in combination so as to provide the aforesaid lowest dielectric constant, or lowest reflectivity. Also, the thicker the panels 9, the better will be the absorption of off-normal incident radar waves.

The function of the conductive foil or sheet 17 is to retroreflect the incoming radar waves up through the panel to provide the required phase cancellation. This conductive layer can be a thin foil or may be a rigid metal sheet if this is necessary to provide support and ridigity to the other layers of the panel. Radar absorbers of this type become reflective at frequencies wherein the foam absorber layers are one half of the free space wavelength. This fact concerning reflectivity must be taken into account in designing these panels. One solution to this problem is to place the resonant reflective frequencies in a portion of the spectrum where the atmospheric absorption is high for example, 60 GHz. Also, the conductive foil reflects incident radiant energy from heat sources within the protected equipment as well as incident radar waves which pass through the seams and are reflected from the metal surfaces of the equipment.

FIG. 4 shows a panel which is designed for a reversible blanket of this type. It comprises a central conductive layer 17 with the alternating foam absorber and resistive layers 19, 21, 23, 25 and 27 above the conductive layer and symmetrically arranged resistive and foam absorber layers 19', 21', 23', 25', and 27' below the central conductive layer. Rather than a one-piece panel of this type, a pair of single-sided panes such as those of FIG. 3 can be placed back-to-back to form a reversible panel.

The illustrative panel of FIG. 3 has three foam absorbers and a pair of resistive layers. A wider absorption bandwidth can be achieved if additional similar foam absorber and resistive layers are used. A tradeoff must be made between panel thickness and absorption bandwidth. For tactical purposes, the blanket thickness preferably should not exceed about one inch, although the thicker the blanket panels, the greater the acoustical and thermal suppression benefits.

The blanket of FIGS. 1 and 2 can be draped over a vehicle or other structure to be protected and it will generally conform to any complex shape since the seams between panels are flexible. Also, this flexibility permits the blanket to be easily folded for compact stowage. The blanket can be attached to the underlying equipment by means of grommets or eyelets along the blanket edge such as those referenced as 10 in FIG. 1, or simply by gravity or other attachment means. Also the blanket may be folded like a road map with one edge attached to a metal framework which can be raised and lowered like a convertible auto top. Also, the blanket can be hung vertically from hooks on vehicles or on a separate metal framework to provide lateral protection in one direction. The blanket should be placed over the equipment so that no reentrant geometries of the blanket itself are formed which could cause retroreflection at frequencies wherein the blanket does not absorb. Thus the blanket surface as viewed externally, should be convex and not concave.

Instead of the double sheet construction shown in FIGS. 1 and 2, a single sheet of fabric material may be provided with pockets in which the panels 9 are inserted. These pockets could be provided with fasteners so that single-sided ATRAM panels such as those of FIG. 3 could be removed and reinserted with the conductive foil layers thereof facing in the other direction. With this arrangement, opposite sides of the supporting fabric would have different camouflage patterns as explained above and when it was desired to reverse the blanket to the other pattern, the panels would be reversed in their pockets so that the conductive layer 17 is against the protected equipment. This would provide a measure of reversibility without the need for the double thickness panels of FIG. 4. Thus, the blanket hereof has been designed to provide optimum tactical considerations, such as being preferably not over about one inch thick, to thereby provide effective camouflage with a low logistic and operational burden. That is, its relatively light weight and flexibility enable it to be conveniently installed and stowed with but a few people.

While the invention has been described in connection with illustrative embodiments, obvious variations therein will occur to those skilled in the art, such a designing the matrix to include a larger multiplicity of the rows and columns of panels, and to custom modify the shape of certain of the polygonal panels as may be desirable for certain equipment to better facilitate the preferred convexly draping or other non-dihedral/trihedral disposition of the blankets with respect to said equipment. Accordingly the invention should be limited only by the scope of the appended claims.

I claim:

1. A lightweight, foldable, wide band energy-absorbing camouflage blanket adaptable to be placed over operating equipment to absorb sound and heat emanating therefrom and to absorb radar waves incident thereon, said blanket comprising:

at least one sheet of heavy duty, abrasion-resistant fabric;

said fabric sheet being provided with a rows-and-columns matrix of individual laminated polygonal panels supported thereon;

said individual panels being of the Jaumann type comprising layers of diverse energy-absorbing materials arranged in combination with each other and with said fabric sheet so as to absorb incident broad band radar waves, and to also absorb and reduce heat and sound emanating from protected equipment over and/or about which one or more of said blanket is placed; and at least one exterior surface of said blanket fabric is characterized to provide visual camouflage according to predetermined tactical environments.

2. The blanket of claim 1, wherein each of said panels comprises a middle conductive layer with alternating semi-rigid expanded foam absorbers and resistive layers on both sides of said conductive layer, and whereby both exterior sides of said blanket fabric are patterned for visual camouflage respectively representative of two different tactical environmental situations, whereby said blanket is more capable of reversible applications.

3. The blanket of claim 1 wherein said blanket incudes two of said fabric sheets joined together in laminated fashion about said panels, and both of said sheets have exterior surfaces visually patterned or characterized for two different tactical environments.

4. The blanket of claim 1, wherein each of said panels comprises a layer of conductive material with superposed alternating layers of at least one layer each of dielectric semi-rigid, expanded closed air cell foam absorbers and of resistive layers above said conductive layer.

5. The blanket of claim 4 wherein said layers of said panels further include a topmost thinner foam absorber, the thinness of which is correlated to that of the blankets fabric sheet so that collectively they are impedance matched to free space to minimize radar reflection.

6. The blanket of claim 4, wherein said panels are designed to absorb the radar waves over the wide bandwidth by phase cancelation means, and wherein said dielectric semi-rigid expanded foam absorbers are characterized by a low dielectric constant and also have good thermal and acoustic insulation properties.

7. The blanket of claim 6, wherein said panel's foam absorbers being one quarter of the free space wave length lowest frequency of radar waves be absorbed.

8. The blanket of claim 7, wherein said foam absorbers comprise a syntactic foam comprising glass Microballs in soft binder for enhancing both their sound and heat absorption qualities as well as their low dielectric constant.

9. The blanket of claim 7, wherein said blanket includes pocket means of a character to facilitate replacement, substitution and selective reversibility of said panels, to contribute to the blanket's tactical advantages.

* * * * *